Sept. 26, 1950          J. M. LAWSON          2,523,834
SELECTIVE GAUGE FOR RIPSAWS Filed April 15, 1948          3 Sheets-Sheet 1

INVENTOR
JOSEPH M. LAWSON
BY Weatherford and
Weatherford
atty

Sept. 26, 1950          J. M. LAWSON          2,523,834
SELECTIVE GAUGE FOR RIPSAWS
Filed April 15, 1948                                3 Sheets-Sheet 2
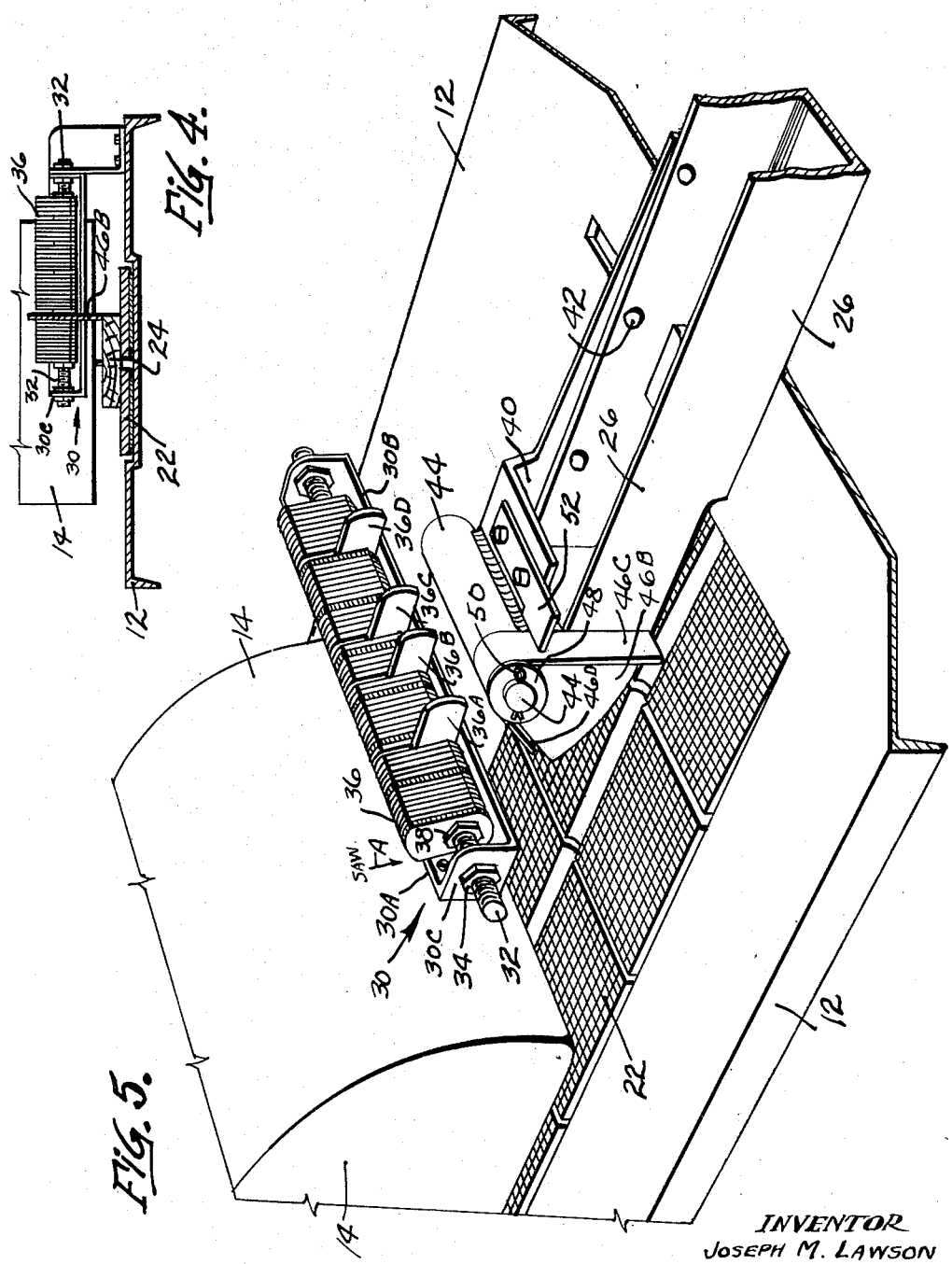
INVENTOR
JOSEPH M. LAWSON
BY Weatherford and Weatherford
Attys Sept. 26, 1950 J. M. LAWSON 2,523,834
SELECTIVE GAUGE FOR RIPSAWS
Filed April 15, 1948 3 Sheets-Sheet 3
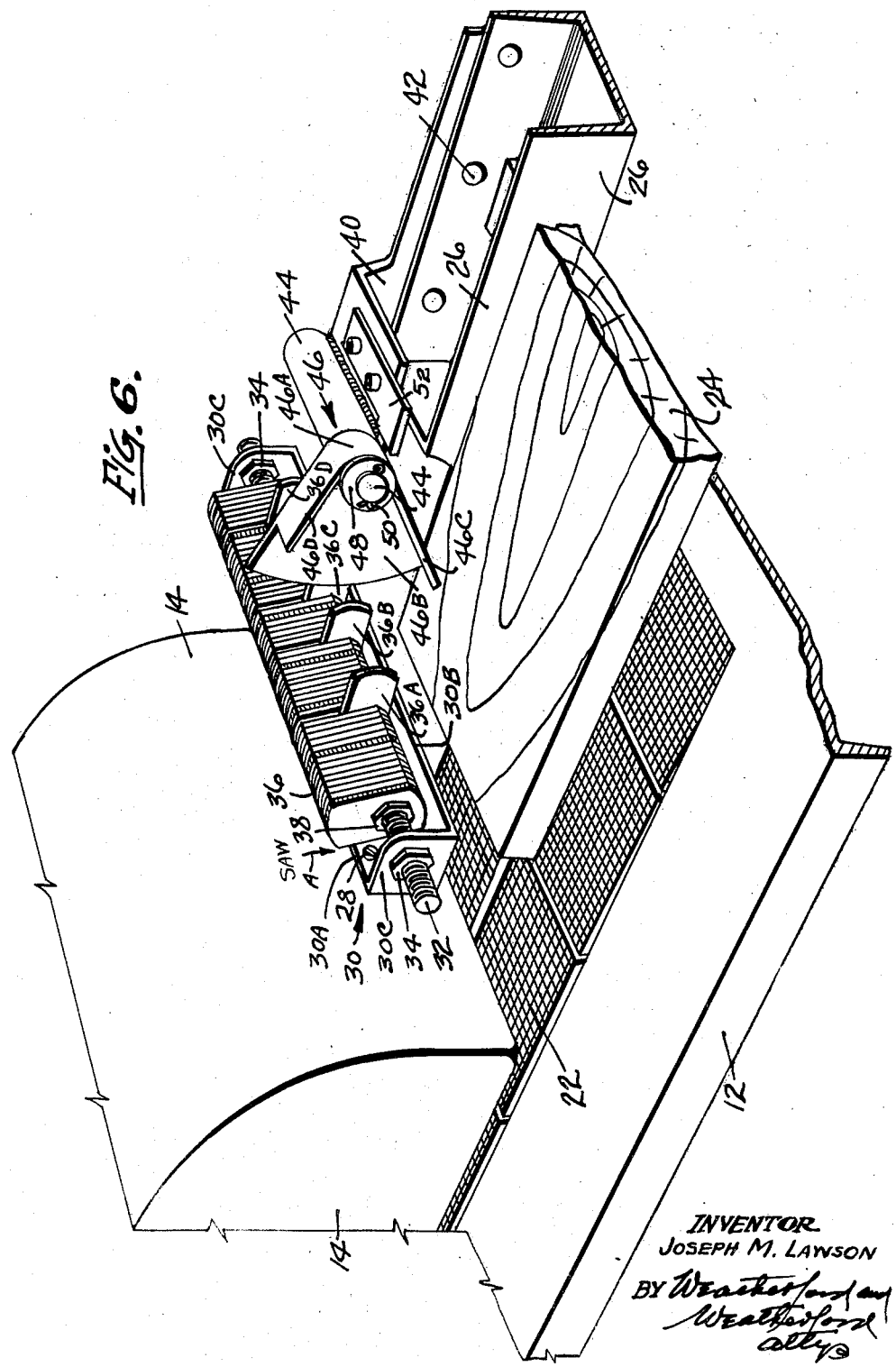
INVENTOR
JOSEPH M. LAWSON
BY Weatherford
Weatherford
attys Patented Sept. 26, 1950

2,523,834

UNITED STATES PATENT OFFICE 2,523,834

SELECTIVE GAUGE FOR RIPSAWS

Joseph M. Lawson, Memphis, Tenn.

Application April 15, 1948, Serial No. 21,253

16 Claims. (Cl. 143—174)

Rip sawing machines are made and used which resaw boards usually in short lengths into stock of narrower width, with precision and accuracy. Saws of this type are equipped with a guide or fence which may be readily shifted by pressure of the board against it and then locked in position, the fence usually returning automatically to initial position when released.

The present invention relates to an auxiliary device designed for attachment to a machine of this type for accurately positioning the fence for the selected width of strip to be cut.

Furniture manufacturers use a number of stock sizes ordinarily ranging from ¾" to 6" or even wider, but the strips cut must conform in width to some stock size. In resawing the lumber the primary consideration is to get out of a board, strips which contain no imperfections, it being obvious that the wide strips are the hardest to obtain, and the operator must be constantly on the alert to get out of each cut made the widest possible strip that conforms to one of the stock widths wanted. Strips ripped to remove imperfections may be of random width but the subsequent strip or strips must be of stock width. This obviously requires frequent resetting of the guide or fence and gaging of the fence so that the strips ripped will be of these stock widths.

The objects of the present invention are:

To provide stop means through which accurate positioning of the fence is accomplished;

To provide stop means which can be readily and easily shifted to adjust the position of the fence and establish desired changes in the width of strip to be cut;

To provide gaging means which includes stops which indicate the spacing therebetween;

To provide stop and cooperative gaging means which will permit free shift to select strip width and subsequently effect accurate gaging of the selected with; and To provide gaging means which will not interfere with use of the machine to rip boards of random width.

The means by which the foregoing and other objects are accomplished, and the manner of their accomplishment will readily be understood from the following specification on reference to the accompanying drawings, in which:

Fig. 4 is a sectional elevational view taken as on the line IV—IV of Fig. 2, showing a modified type of stop support.

Figure 1:
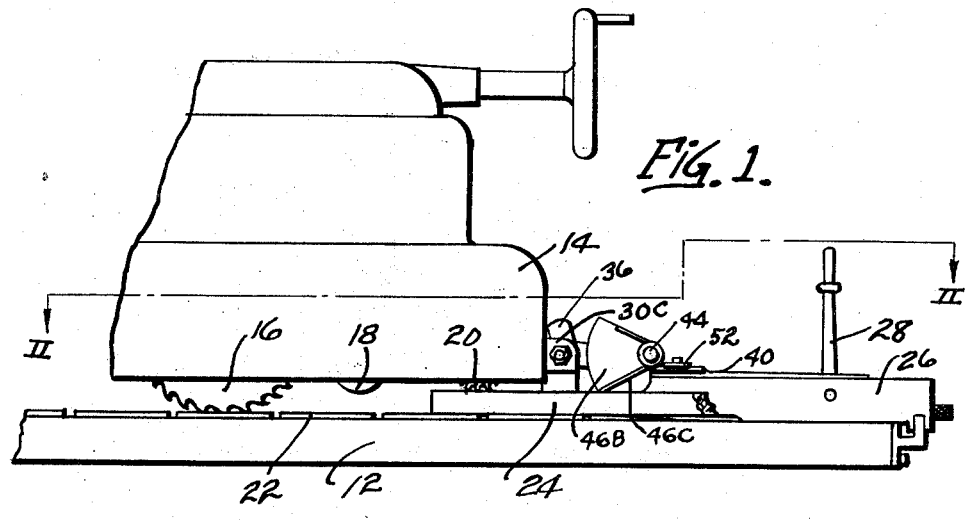
Fig. 1 is a side elevation of the feed-in end of the saw table and saw of a typical rip saw machine equipped with the adjustable gage.
Figure 2:
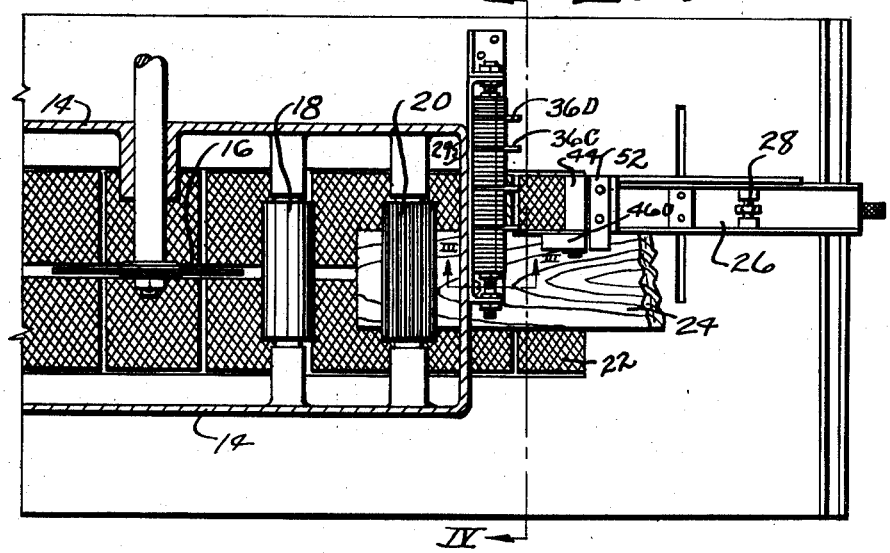
Fig. 2 is a corresponding plan view with the saw housing cut away along the line II—II of Fig. 1 to disclose the saw and its alinement relatively to the gage and fence.
Figure 3:
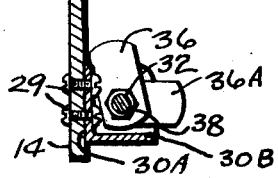
Fig. 3 is a fragmentary sectional elevation on the line III—III of Fig. 2 showing attachment of the gage to the saw housing.

Fig. 5 is a perspective view of the gage with the fence in idle position showing stops set to gage varying widths of strip; and Fig. 6 shows a corresponding view with a board on the table, the fence having been moved by lateral shift of the board, and the stop cooperating gage part set by longitudinal movement of the board toward the saw to position the gage part for gaging engagement with one of the stops.

Referring now to the drawings in which the various parts are indicated by numerals: The rip sawing machine of usual type includes a saw table 12, above which is a table supported housing 14, in which a rip saw 16 is suitably journalled. The housing also carries hold down rolls 18 and 20 which cooperate with feed tracks 22 projecting slightly above the table to move a board 24 which is to be resawed into cutting contact with the saw 16. Mounted on the table, in advance of the saw, is a fence or guide 26 which alines the board being cut as it is fed toward the track and rollers. In different types of machines these fences are variously mounted and held in alinement so that they may be easily shifted away from the line of the saw cut by pressure of the board against the fence, and when positioned may be clamped against further movement as through the use of a hand lever 28. Ordinarily the fence is automatically returned to initial position when pressure against it is released, these parts, however, forming part of the machines and not being here shown in detail.

Secured to the housing 14, as by bolts or screws 29, is a stop support 30, Figs. 4 to 6, preferably of angle shape, having a vertical leg 30A seated against the housing, and an outwardly extending horizontal leg 30B, the support having end members 30C which are apertured to receive a spindle 32. The spindle is threaded at its ends and secured for longitudinal adjustment and against longitudinal displacement by nuts 34 inside and outside of the end members 30C. Turnably disposed on the spindle 32 are a plurality of stop lugs 36, these lugs having a length of the nature of twice their width, being apertured adjacent one end to receive the spindle, and being disposed thereon to extend upward and lie against the leg 30A.

The lugs are flat and preferably ⅛" thick, where strips are to be cut in widths measured in inches and eighths, though they may obviously be of other thickness should different measurements be used. Where lug thicknesses are ⅛" every eighth lug is preferably distinguished as by use of a metal of different color from the other lugs to provide convenient means for identifying the even inches, the even inch lugs, for example, being of brass, whereas the other lugs are of steel. It will be understood, however, that other identifying means, such as a different length or shape of lug, may be used. The lugs are secured against displacement along the spindle by nuts 38 disposed at opposite ends of the entire group, these nuts being adjustable along the spindle to position the group of lugs and to clamp them against turning. In use one of the nuts is loosened to permit turning of desired lugs and thereafter tightened to prevent subsequent movement.

It will be understood that should the shape or position of the housing make attachment of the stop support thereto difficult or inadvisable, the support 30, as shown in Fig. 4, may be directly secured to and carried by the saw table 12, the construction of the lug assembly preferably being otherwise unchanged.

Cooperating with the lug assembly is a dog assembly which is carried by the fence and moved therewith, this assembly preferably comprising a bracket 40 secured to the fence 26 as by rivets or screws 42. The bracket 40 supports a horizontally disposed pin 44 which projects laterally beyond the guiding face of the fence 26, on which pin the hub 46A, Fig. 6, of a dog 46 is mounted for free swinging movement, the dog being secured against displacement along the pin as by a washer 48 and retaining key 50. The dog 46 includes a plate 46B preferably of the thickness of one lug, which plate may lie in sliding contact with the face of the fence, the plate preferably having an arcuate edge concentric with the pin 44 and a laterally extending flange 46C which, depending on its position during use, lies along its lower or its forward edge, and plate 46B may be stiffened along a portion of its opposite edge by a similar flange 46D. The plate, or plate sector, 46B and the edge flanges thereof flare away from the hub 46A at substantially less than a right angle, and swing downward about the pin 44. Downward movement is preferably stopped when the flange 46C is substantially vertical, by a check block 52. The lug and dog assemblies are relatively so positioned that when the dog is swung rearward and upward, the arcuate edge of the dog plate 46B clears the sides of those of the lugs 36 which are upright, and lies in the path of lugs 36A, 36B, etc. which have been turned to horizontal position, and clears all of them when it hangs downward.

To set the stop means for use, the nuts 38 are adjusted to line the first of the lugs 36 with the line of the saw cut, this line usually being indicated by an arrow A on the housing 14. One of the nuts 38 is then loosened and one or more of the lugs are selected and turned down into horizontal or stop position. In Fig. 5 the first of these lugs 36A has been selected and set to cut a strip exactly 1¾" wide, the lug 36B to cut a strip exactly 3⅜" wide, the lug 36C to cut a strip 4¼" wide, and the lug 36D to cut a strip 6⅛" wide. If additional stop widths are desired additional lugs indicating such width are turned down, it being possible to turn down and use any number of lugs so long as the space between any two thereof is substantially greater than the thickness of the stop portion 46B of the dog 46. Preferably this portion of the dog is of the nature of ⅛" thick and a spacing equalling two lugs is ample. With the dog hanging free, the fence 26 is shifted, or allowed to shift, to initial position which is exactly in line with the saw cut and first dog.

The board 24, here shown as a narrow board, from which a wide stock strip is to be cut and a relatively minor edge strip is to be removed, is placed on the saw table 12 and moved against the fence 26, in front of, and out of contact with the dog 46. By pressure of the board against the fence, the fence is shifted to approximately the width of clear strip which it is desired or is possible to cut therefrom, the line of cut which will be made being clearly evident on the table by the space between the saw tracks 22. The dog 46 hanging downward is out of possible contact with any of the lugs, and moves past any lugs horizontally disposed to position the fence for narrower width strips. The board is then moved along the fence toward the saw, engaging the flange 46C of the dog and swinging the dog upward into lug engaging position, after which position is established the board and fence are further shifted laterally until dog engagement with the first lug therebeyond stops the movement and a stock width of strip is established. The fence may be clamped by shift of the lever 28, and the board guided by the fence shifted toward saw engagement until the track 22 and rollers 20 take over, feed the board to the saw, and the desired stock width of strip is cut off. When the board has passed beyond the fence, the fence is unclamped and shifted, or allowed to shift, to initial position and the operation is repeated with an additional board, it being noted that a strip of any stock width for which a lug has been set may be cut therefrom, without reference to the width of the preceding strip. It will be understood, however, that clamping of the fence is unnecessary, and in fact, undesirable since the fence is prevented from shift by cooperation of the stop 46B and the lug, as the lug 36C, against which the stop is engaged, as shown in Fig. 6, so long as the board 24 is held against the fence 25 by the operator, which holding must continue until the track and roller take over.

It will be understood that the dog 46 may be turned upward and forward about the pin 44 until the flange 46D rests on the check block 52, and the fence 26 be operated free from the device for cutting random or other widths.

It will be further understood that the lug assembly may be mounted on the fence, and the stop assembly be carried by the housing or table should it be so desired.

I claim:

1. In a rip sawing machine which includes a table, a rip saw, a saw housing, and an adjustable fence having a face for guiding boards to said saw; fence positioning means which comprises cooperating table and fence-carried means; said table-carried means including a spindle, means carried by said housing supporting said spindle above and parallel with said table and transversely thereto, a plurality of lugs apertured to receive said spindle and mounted thereon, said lugs being individually and selectively shiftable around said spindle, means for clamping said lugs on said spindle and for adjusting them relatively therealong, said lugs being of greater length than width and said apertures being adjacent one of their ends, and means forming part of said spindle supporting means, for limiting turning movement of said lugs between substantially upright and forwardly extending horizontal positions; said fence-carried means including a pin projecting laterally beyond the face of said fence and spaced above said table, and a dog oscillatably mounted on said pin, said dog including a depending plate sector at right angles to said pin, and of greater depth than width, said sector having an arcuate edge substantially concentric with said pin, and a laterally extending flange along its forward edge, said flange extending into adjacency to said table for displacement of said sector by shifting movement of a board along said table toward said saw, said plate sector being spaced from said table-carried means to clear all of said lugs when said sector is in depending position, and for engagement with horizontally disposed said lugs when said sector is displaced by said board.

2. In a rip sawing machine which includes a table, a rip saw, and an adjustable fence having a face for guiding boards to said saw; fence positioning means which comprises cooperating table-carried and fence-carried means; said table-carried means including a spindle, means carried by said table supporting said spindle above and parallel with said table and transversely thereto, a plurality of lugs apertured to receive said spindle and mounted thereon, said lugs being individually and selectively shiftable around said spindle, means for clamping said lugs on said spindle and for adjusting them relatively therealong, said lugs being of greater length than width and said apertures being adjacent one of their ends, and means, which may form part of the spindle supporting means, for limiting turning movement of said lugs between substantially upright and forwardly extending horizontal positions; said fence-carried means including a pin projecting laterally beyond the face of said fence and spaced above said table, and a dog oscillatably mounted on said pin, said dog including a depending plate sector at right angles to said pin, and of greater depth than width, said sector having an arcuate edge substantially concentric with said pin, and a laterally extending flange along its forward edge, said flange extending into adjacency to said table for displacement of said sector by shifting movement of a board along said table toward said saw, said plate sector being spaced from said table-carried means to clear said lugs when said sector is in depending position, and for engagement with horizontally disposed said lugs when said sector is displaced by said board.

3. Fence positioning means in accordance with claim 2 in which said lugs are flat plate like members of equal thickness.

4. Fence positioning means in accordance with claim 2 in which said lugs are flat and have a thickness of 1/8" each, whereby fence positioning may directly and exactly indicate the width of strip being cut.

5. Fence positioning means in accordance with claim 2 in which said lugs are flat, have a thickness of 1/8" and every eighth lug is distinctly marked, whereby fence positioning may directly and exactly indicate the width of strip being cut.

6. In a rip sawing machine which includes a table, a rip saw, and an adjustable fence having a face for guiding boards to said saw; fence positioning means which comprises cooperating table-carried and fence-carried means; said table-carried means including a spindle, means carried by said table supporting said spindle above and parallel with said table and transversely thereto, a plurality of lugs apertured to receive said spindle and mounted thereon, said lugs being individually and selectively shiftable around said spindle, means for clamping said lugs on said spindle, said lugs being of greater length than width and said apertures being adjacent one of their ends, and means, which may form part of the spindle supporting means, for limiting turning movement of said lugs between substantially upright and forwardly extending horizontal positions; said fence-carried means including a pin projecting laterally beyond the face of said fence and spaced above said table, and a dog oscillatably mounted on said pin, said dog including a depending plate sector at right angles to said pin, and of greater depth than width, said sector having an arcuate edge substantially concentric with said pin, and a laterally extending flange along its forward edge, said flange extending into adjacency to said table for displacement of said sector by shifting movement of a board along said table toward said saw, said plate sector being spaced from said table-carried means to clear said lugs when said sector is in depending position, and for engagement with horizontally disposed lugs when said sector is displaced by said board.

7. In a rip sawing machine which includes a table, a saw, and an adjustable fence having a face for guiding boards to said saw; fence positioning means which comprises cooperating table-carried and fence-carried means; said table-carried means including a spindle, means carried by said table supporting said spindle above and parallel with said table and transversely thereto, a plurality of lugs apertured to receive said spindle and mounted thereon, and means for clamping said lugs on said spindle, said lugs being of greater length than width and said apertures being adjacent one of their ends, and being individually and selectively turnable about said spindle between substantially upright and forwardly extending horizontal positions; said fence-carried means including pivot means projecting laterally beyond the face of said fence and spaced above said table, a plate like member of greater depth than width mounted adjacent one of its ends on said pivot means, and at right angles thereto, and depending therebelow, said member having along its forward edge a laterally projecting part of length to extend downward into adjacency with said table for engagement and rearward displacement of said members by a board on said table which is being moved toward said saw, said pivot means being spaced from said spindle in excess of the joint forward projection of said lugs in horizontal position and rearward projection of said plate in dependent position, and less than the joint forward projection of said lugs in horizontal position and rearward projection of said plate in displaced position.

8. In a rip sawing machine which includes a table, a saw, and an adjustable fence having a face for guiding boards to said saw; fence positioning means which comprises cooperating table-carried and fence-carried means; said table-carried means including a spindle, means carried by said table supporting said spindle above and parallel with said table and transversely thereto, a plurality of flat lugs of equal thickness apertured to receive said spindle and mounted thereon, and means for clamping said lugs on said spindle, said lugs being of greater length than width and said apertures being adjacent one of their ends, and being individually and selectively shiftable around said spindle between substantially upright and forwardly extending horizontal positions; said fence-carried means including pivot means projecting laterally beyond the face of said fence and spaced above said table, a plate of greater depth than width mounted adjacent one of its ends on said pivot means, at right angles thereto, and depending therebelow, said plate having along its forward edge a laterally projecting part of length to extend downward into adjacency with said table for engagement by a board on said table moved toward said saw, and rearward displacement of said plate, said pivot means being spaced from said spindle in excess of the joint forward projection of said lugs in horizontal position and rearward projection of said plate in dependent position, and less than the joint forward projection of said lugs in horizontal position and rearward projection of said plate in displaced position.

9. In a rip sawing machine which includes a table, a saw, and an adjustable fence having a face for guiding boards to said saw; fence positioning means which comprises cooperating table-carried and fence-carried means; said table-carried means including a spindle, means carried by said table supporting said spindle above and parallel with said table and transversely thereto, a plurality of plate like lugs apertured to receive said spindle and mounted thereon, and against displacement therealong, said lugs being of greater length than width and said apertures being adjacent one of their ends, and being individually and selectively shiftable around said spindle between substantially upright and forwardly extending horizontal positions; said fence-carried means including pivot means projecting laterally beyond the face of said fence and spaced above said table, a plate of greater depth than width and of substantially lug thickness mounted adjacent one of its ends on said pivot means, at right angles thereto, and depending therebelow, said plate having along its forward edge a laterally projecting part of length to extend downward into adjacency with said table for engagement by a board on said table which is being moved toward said saw, and rearward displacement of said plate, said fence carried plate being spaced from said table-carried lugs to clear said lugs when said plate is depending from said pin and for engagement with horizontally disposed ones only of said lugs when said plate is rearwardly displaced.

10. In a rip sawing machine which includes a saw, a table and a shiftable fence; fence positioning means including a lug assembly and a cooperating stop assembly, means respectively mounting said lugs assembly on said table, and said stop assembly on said fence in adjacency to, but free from interference of, the one with the other, said lug assembly including a plurality of lugs, means disposed transversely to said fence eccentrically supporting said lugs for shift, means limiting movement of said lugs between upright positions remote from, and horizontal positions proximate to, said stop assembly; said stop assembly comprising support means, means oscillatably carried by said support means and including a trip portion extending into proximity to said table and displaceable by shift toward said saw of a board to be ripped, and a dog portion integral with and movable by said trip portion into overlapping relation to horizontally positioned ones only of said lugs.

11. In a rip sawing machine which includes a saw, a table and a shiftable fence; fence positioning means including a lug assembly and a cooperating stop assembly, means respectively mounting said lug assembly on said table, and said stop assembly on said fence in adjacency to but free from interference of, the one with the other, said lug assembly including a plurality of lugs, means disposed transversely to said fence eccentrically supporting said lugs for shift, means limiting movement of said lugs between upright position remote from, and horizontal position proximate to, said stop assembly; said stop assembly including support means, a dog oscillatably carried by said support means and extending into proximity to said table and displaceable into overlapping relation to horizontally positioned ones only of said lugs, by shift toward said saw of a board to be ripped.

12. In a rip sawing machine which includes a saw, a table and a shiftable fence; fence positioning means including a lug assembly and a cooperating stop assembly, means respectively mounting one of said assemblies on said table, and the other thereof on said fence in adjacency to, but free from interference of, the one with the other, said lug assembly including a plurality of lugs, means disposed transversely to said fence eccentrically supporting said lugs for shift, means limiting movement of said lugs between upright positions remote from, and horizontal positions proximate to, said stop assembly; said stop assembly comprising support means, means oscillatably carried by said support means and including a trip portion extending into proximity to said table and displaceable by shift toward said saw of a board to be ripped, and a dog portion integral with and movable by said trip portion into overlapping relation to horizontally positioned ones only of said lugs.

13. In a rip sawing machine, which includes a saw, a table and a shiftable fence; fence positioning means including a lug assembly and a cooperative stop assembly, means respectively mounting one of said assemblies on said table and the other thereof on said fence in adjacency but clearing the one the other; said lug assembly comprising a plurality of eccentric lugs individually shiftable to and from vertically extending positions toward horizontally extending positions facing said stop assembly; said stop assembly including an oscillatably mounted dog depending into adjacency with the surface of said table, for displacement into overlapping relation with horizontally disposed ones only of said lugs, by shift of a board to be cut toward said saw.

14. In a rip sawing machine, which includes a saw, a table and a shiftable fence; fence positioning means including a lug assembly and a cooperative stop assembly, means respectively mounting said lug assembly on said table and said stop assembly on said fence in adjacency, but with the one clearing the other; said lug assembly comprising a plurality of eccentric lugs individually shiftable to and from vertically extending positions toward horizontally extending positions facing said stop assembly; said stop assembly including an oscillatably mounted dog depending into adjacency with the surface of said table, for displacement into overlapping relation with horizontally disposed ones only of said lugs, by shift of a board to be cut toward said saw.

15. In a rip sawing machine, which includes a saw, a table and a shiftable fence; fence positioning means including a lug assembly and a cooperative stop assembly, means respectively mounting one of said assemblies on said table and the other thereof on said fence; said lug assembly comprising a plurality of lugs individually shiftable to and from retracted positions toward extending positions facing said stop assembly; said stop assembly including an oscillatably mounted stop depending into adjacency with the surface of said table, said fence and table supporting said assemblies in adjacency, but clearing the one the other, and said stop for displacement into overlapping relation with extended ones only of said lugs by shift toward said saw of a board to be cut.

16. In a rip sawing machine, which includes a saw, a table and a shiftable fence; fence positioning means including a lug assembly and a cooperative stop assembly, means mounting said lug assembly on said table and said stop assembly on said fence; said lug assembly comprising a plurality of lugs individually shiftable to and from retracted positions toward extending positions facing said stop assembly; said stop assembly including an oscillatably mounted stop depending into adjacency with the surface of said table, said fence and table supporting said assemblies in adjacency, but clearing the one the other, and said stop for displacement into overlapping relation with extended ones only of said lugs by shift toward said saw of a board to be cut.

JOSEPH M. LAWSON.

REFERENCES CITED

The following references are of record in the file of this patent:

UNITED STATES PATENTS

| Number | Name | Date |
|---|---|---|
| 1,427,757 | MacDowell et al. | Aug. 29, 1922 |
| 1,763,333 | Vivarttas | June 10, 1930 |